Jan. 19, 1937.  A. TROSCH  2,068,523
MACHINE TOOL
Filed April 27, 1936
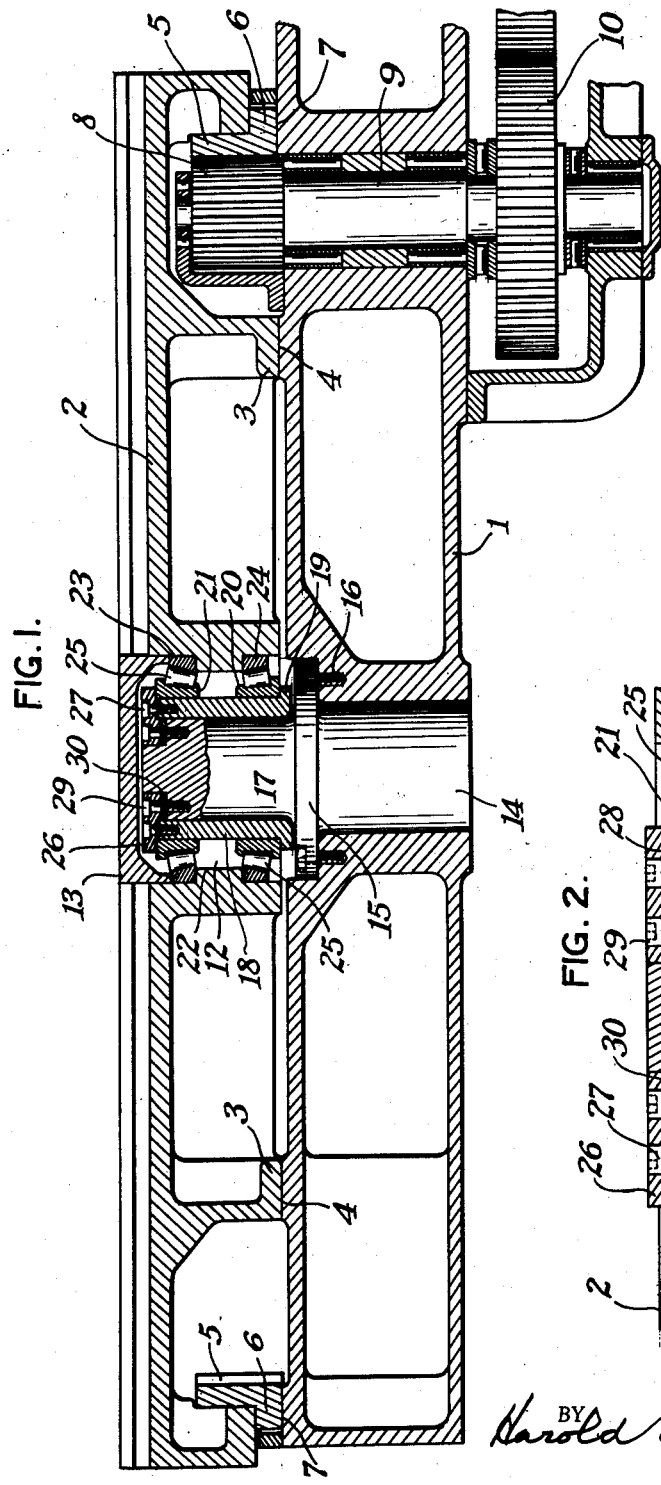
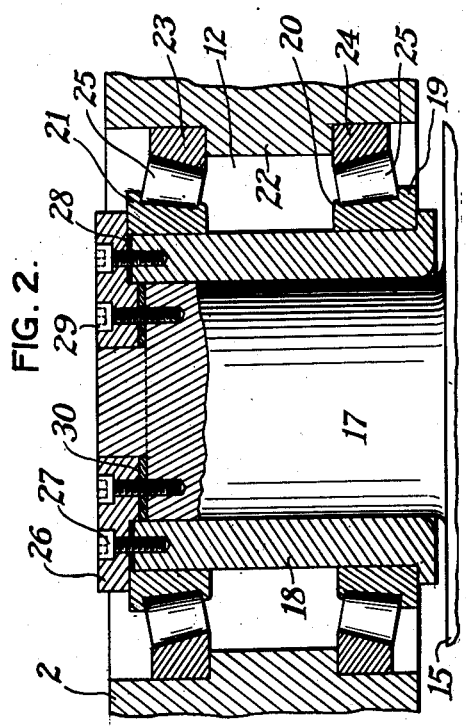
INVENTOR.
ALFRED TROSCH
BY Harold E. Stonebraker,
ATTORNEY.

Patented Jan. 19, 1937

2,068,523

UNITED STATES PATENT OFFICE 2,068,523

MACHINE TOOL

Alfred Trosch, Rochester, N. Y., assignor to Consolidated Machine Tool Corporation, Rochester, N. Y., a corporation of Delaware Application April 27, 1936, Serial No. 76,537

REISSUED

4 Claims. (Cl. 77—63)

This invention relates to a machine tool, with more particular reference to machines employing a rotating work table such as a vertical boring mill, and has for its object to afford an improved bearing arrangement for the table so as to insure its being accurately centered at all times, whereby any portion of the table is always certain to travel in a true circular path and to maintain a uniform distance from the center.

In a more specific aspect, the invention is intended to afford a construction in which the bearings for the work table are located substantially in horizontal alinement with the driving connection to the table so that any side thrust imparted by the driving connection is resisted in a direct line by the bearings, thus obviating any twisting tendencies and causing the table to be perfectly balanced and to carry the work more accurately with relation to the center of rotation.

Another object of the invention is to afford an arrangement of bearings and supports therefor that facilitates ready adjustment necessary to take up wear, and maintain accurate movement of the table under all conditions.

An additional object is to provide a construction that is economical to manufacture, easy to assemble, and which is efficient and practical in the accomplishment of the results to be attained.

To these and other ends, the invention consists in the construction and arrangement of parts that will appear from the following description when read in conjunction with the accompanying drawing, the novel features being pointed out in the claims following the specification.

In the drawing:

Fig. 1 is a vertical sectional view taken centrally of the work table of a boring mill, and showing one embodiment of the invention, and Fig. 2 is an enlarged sectional view of the bearing assembly.

Referring more particularly to the drawing in which like reference numerals indicate the same parts throughout the views, 1 designates a stationary base or bed of a vertical boring mill, and 2 is a work table adapted to be supported upon the base and rotated thereon. To this end, the work table 2 has a depending flange 3 that rests upon and travels around on the supporting surface 4 of the base or bed, and 5 is an internal ring gear rigidly secured to the work table and including a bottom flange 6 which rests upon and travels on the outer portion 7 of the base. The ring gear 5 is engaged and driven by a pinion 8 carried by a spindle 9 that is journalled in the base 1 and carries at its lower end a gear 10 to which motion is transmitted through gearing from any suitable source of power.

In order to permit free and true rotation of the work table with relation to its center, and to prevent any upward, downward, or twisting tendencies, the table is arranged to travel around bearings located between its top and bottom and in horizontal alinement generally with the driving pinion 8 and ring gear 5. To accomplish this end, the table has a central opening designated at 12, and provided with a cap or cover 13, that is removable to permit access to the bearings for adjustment. The base or bed 1 is provided with a central pillar 14 carrying a flange 15 that is rigidly secured to the base by bolts 16 and has an upstanding support or post 17 that extends upwardly into the opening 12 of the table.

Mounted upon the post or support 17 is a collar 18 having an outwardly projecting flange 19 at its lower end upon which is supported a conical bearing ring 20, while 21 designates a conical bearing ring surrounding the top of the collar 18 and slidable vertically thereon for a purpose that will appear presently. The work table 2 is provided with a radially projecting flange 22 affording shoulders at the top and bottom thereof against which rest the conical bearing rings 23 and 24, while 25 designates conical roller bearings located between the rings 20 and 21, and 24 and 23, respectively.

26 designates an adjusting plate that is secured to the collar 18 by means of bolts 27, and the required adjustment is obtained by one or more shims 28 positionable between the lower surface of the adjusting plate 26 and the top of the collar 18. By tightening the adjusting plate 26 against the collar 18, the collar is drawn upwardly until there is a snug fit between the lower rings 20 and 24 and the roller bearings between them, and thereafter the upper ring 21 is forced downwardly by the adjusting plate 26, the outer edge of which engages the upper ring 21 as shown, until a snug fit is had between the bearing rings 21 and 23 and the roller bearings 25 between them. The required number of shims 28 are inserted between the adjusting plate 26 and the collar 18 to afford a close fit between these parts when the bolts 27 are tightened and to maintain the bearings properly adjusted.

As wear takes place in the bearings, if looseness occurs, the bearings are taken up by removing the adjusting plate 26 and taking out one or more of the adjusting shims to permit a greater downward adjustment of the upper bearing ring 21 and a greater upward movement of the collar 18. In this manner, the parts can be quickly assembled and tightened at any time to insure the proper relation between the table and the roller bearings, so as to effect true and accurate rotation of the table about its center. Since the roller bearings are located between the top and bottom of the table, and since the driving pinion 8 and ring gear 5 are likewise located between the top and bottom of the table, the bearings are substantially in horizontal alinement with the driving connection to the table. Thus any side thrust that might be set up by the driving pinion 8 is resisted in a direct line by the bearing assembly, and any twisting of the table or torsional strains are thus effectively prevented.

The collar 18 is rigidly secured to the upper end of the support 17 by means of bolts 29, while 30 designates a shim located between the adjacent surface of the adjusting plate and support 17 to insure a solid contact at this point and thus effect a rigid and firm assembly. By attaching the adjusting plate 26 securely to the post 17, it will be observed that the top bearing ring 21 and consequently the work table, is held rigidly against any lifting tendency that might occur when the work is engaged by a tool. Thus the work table is held against any movement except that of true rotation on the base, and by locating the bearing assembly in line with the driving connection to the work table, all strains and twisting moments are effectively eliminated so that the table is more perfectly balanced and has a freer and more accurate rotational movement than with structures commonly in use heretofore in this type of machinery. The bearing assembly is readily accessible to permit any necessary adjustment of the bearing rings and collar 18 by removing the cover 13 which is located in the central opening of the work table and preferably rests upon the bearing ring 23, as shown in Fig. 1.

While the invention has been disclosed with reference to a particular structural embodiment, it is not confined to the details herein set forth, and this application is intended to cover any modifications or departures from the details shown that may come within the purposes of the invention or the scope of the following claims.

I claim:

1. In a machine tool, the combination with a base having an upstanding support, a collar adjustably fixed on the support, upper and lower conical bearing rings adjustably and fixedly mounted respectively on said collar, of a rotatable work table mounted on the base and having a central opening to receive said support, conical bearing rings on the work table between the top and bottom thereof, and bearings arranged between said rings on the collar and work table.

2. In a machine tool, the combination with a base having an upstanding support, a collar adjustably fixed on the support, upper and lower conical bearing rings adjustably and fixedly mounted respectively on said collar, of a rotatable work table mounted on the base and having a central opening to receive said support, a gear carried by the work table, a driving pinion engaging said gear, said work table having a central opening to receive said support, conical bearing rings on the work table, and bearings arranged between the rings on the collar and work table and positioned substantially in line with the side thrust set up by said gear and pinion.

3. In a machine tool, the combination with a base having an upstanding support, a collar adjustable on the support, upper and lower conical bearing rings adjustably and fixedly mounted respectively on said collar, a head overlying said upper ring and adjustably fixed to the collar and to said support, of a rotatable work table mounted on the base and having a central opening to receive said support, a gear carried by the work table, a driving pinion engaging said gear, said work table having a central opening to receive said support, conical bearing rings on the work table, and bearings arranged between the rings on the collar and work table and positioned substantially in line with the side thrust set up by said gear and pinion.

4. In a machine tool, the combination with a base having an upstanding support, a collar fixedly attached to the support and adjustable vertically thereon, a lower conical bearing ring carried by said collar at the lower end thereof, an upper conical bearing ring arranged around the collar at the upper end thereof, a rotatable work table mounted on the base and having a central opening to receive said support, conical bearing rings on the work table, bearings arranged between the bearing rings on the work table and on the collar, a head fixedly secured to the upper end of the support and overlying said collar and upper bearing ring thereon, and means for adjustably securing the collar to the head and permitting vertical adjustment of the collar on the support.

ALFRED TROSCH.